United States Patent
Haas et al.

(10) Patent No.: US 7,437,211 B1
(45) Date of Patent: Oct. 14, 2008

(54) ENHANCED REMOTE JOG HANDLE

(75) Inventors: Gene F. Haas, Camarillo, CA (US);
William F. Tandrow, Simi Valley, CA (US); Eric R. Wood, Simi Valley, CA (US); David E. Wolf, Sunland, CA (US);
Michael A. Teitel, Ventura, CA (US);
Bryan S. McIntyre, Ventura, CA (US);
Andy P. Crick, Woodinville, WA (US)

(73) Assignee: Haas Automation, Inc., Oxnard, CA (US)

( * ) Notice: Subject to any disclaimer, the term of this patent is extended or adjusted under 35 U.S.C. 154(b) by 0 days.

(21) Appl. No.: 11/727,023

(22) Filed: Mar. 23, 2007

(51) Int. Cl.
*G06F 19/00* (2006.01)
*G05B 15/00* (2006.01)
*G05B 19/00* (2006.01)

(52) U.S. Cl. .................. 700/188; 700/85; 700/168; 700/180; 700/264

(58) Field of Classification Search ............. 700/83–85, 700/159, 160, 168, 186, 188, 192, 193, 257, 700/264, 180; 348/211.7, 211.8
See application file for complete search history.

(56) References Cited

U.S. PATENT DOCUMENTS

| | | | | |
|---|---|---|---|---|
| 4,477,754 A | * | 10/1984 | Roch et al. ............... 318/568.1 |
| 5,440,325 A | * | 8/1995 | Edmark, III ................. 345/184 |
| 5,838,882 A | * | 11/1998 | Gan et al. .................... 700/259 |
| 6,445,936 B1 | * | 9/2002 | Cannon et al. .............. 455/573 |
| 6,697,681 B1 | * | 2/2004 | Stoddard et al. .............. 700/17 |
| 6,885,898 B1 | * | 4/2005 | Brown et al. .................. 700/65 |
| 2002/0190948 A1 | * | 12/2002 | Coutant et al. .............. 345/161 |
| 2006/0047393 A1 | * | 3/2006 | Casey .......................... 701/50 |

* cited by examiner

*Primary Examiner*—Sean P Shechtman
(74) *Attorney, Agent, or Firm*—McDermott Will & Emery LLP

(57) ABSTRACT

A system for controlling a machine tool is provided. The system includes a user input device deflectable from a neutral position and a controller configured to receive information corresponding to an amount of deflection of the user input device from the neutral position and to output a control signal to control a movement of the machine tool in an axis of movement at a rate corresponding to the amount of deflection of the user input device from the neutral position. A machine is provided, including a work tool movable along an axis of movement and a control system including a user input device deflectable from a neutral position and a controller configured to receive information corresponding to an amount of deflection of the user input device from the neutral position and to output a control signal to control a movement of the work tool in an axis of movement at a rate corresponding to the amount of deflection of the user input device from the neutral position.

20 Claims, 5 Drawing Sheets

ENHANCED REMOTE JOG HANDLE

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention generally relates to machine tools, and, in particular, relates to systems for controlling machine tools.

BACKGROUND OF THE INVENTION

Computer numerical control ("CNC") machine tools provide a high degree of precision for machining workpieces into a virtually limitless variety of shapes and sizes, but the manner in which these tools are controlled is not always ideal for the operator. Some tools require an operator to control the machine tool from a main control, out of sight of the workpiece. Other systems provide a remote jog handle, which allows an operator to input commands to the machine tool from a more convenient location. Nevertheless, these remote jog handles suffer from a number of drawbacks, including confusing inputs that require an operator direct his gaze away from the workpiece to input a command and reduced functionality. Whether located on a remote jog handle or on the main control, these systems are limited by the rigidity of their controls, which only allow an operator to move or "jog" a machine tool in fixed increments.

SUMMARY OF THE INVENTION

The present invention solves the foregoing problems by providing a control system for machine tools which allows an operator to smoothly vary the speed of a movement of the machine tool in an intuitive manner. A "shuttle" or throttle style control input is provided, whereby the speed of a movement of the machine tool (in any axis, whether linear, rotary, or a combination thereof) can be varied corresponding to a degree of movement of the control input.

According to one embodiment of the present invention, a system for controlling a machine tool comprises a first user input device deflectable from a neutral position and a controller configured to receive information corresponding to an amount of deflection of the first user input device from the neutral position and to output a control signal to control a movement of the machine tool in an axis of movement at a rate corresponding to the amount of deflection of the first user input device from the neutral position.

According to another embodiment of the present invention, a machine tool comprises a work tool movable along at least one axis of movement and a control system. The control system includes a first user input device deflectable from a neutral position and a controller configured to receive information corresponding to an amount of deflection of the first user input device from the neutral position and to output a control signal to control a movement of the work tool in an axis of movement at a rate corresponding to the amount of deflection of the first user input device from the neutral position.

According to one embodiment of the present invention, a remote jog handle for controlling a machine tool comprises a first user input device, a controller configured to receive an input signal from the first user input device and to output a control signal to control a movement of the work tool in an axis of movement and a controllable light source for illuminating the machine tool.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
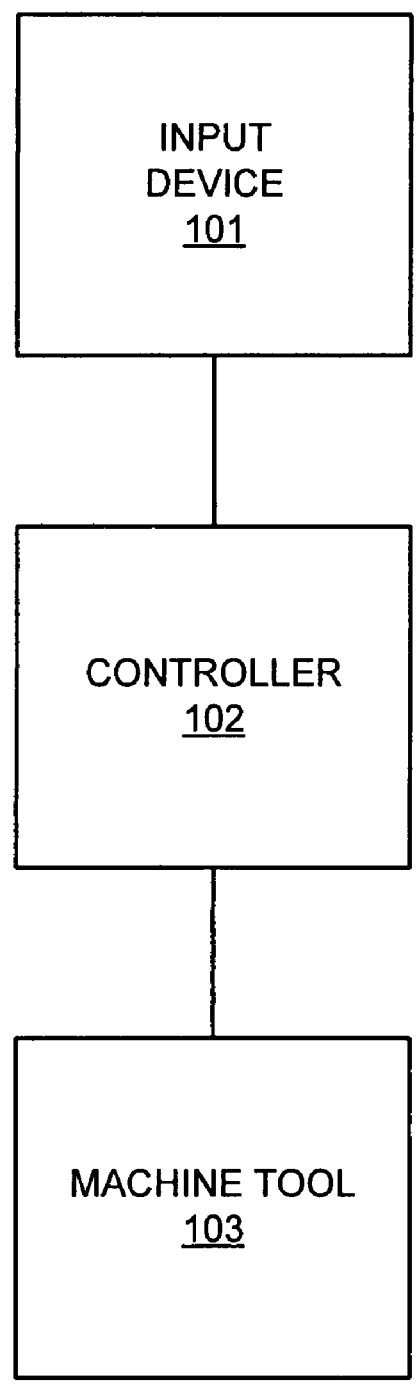
FIG. 1 is a block diagram illustrating a machine tool system according to one embodiment of the present invention.

FIG. 1 is a block diagram illustrating a machine tool system according to one embodiment of the present invention. The system includes an input device 101 that accepts input from an operator, a controller 102 for outputting control signals responsive to the operation of input device 101, and a machine tool 103. Input device 101 is deflectable from a neutral position in an axis of deflection (e.g., a rotatable knob, a slidable switch, a joystick, etc.), and is self-centering (e.g., in the absence of operator input, input device 101 returns to the neutral position). Input device 101 can be deflected from the neutral position by varying amounts (e.g., a rotary knob can be deflected by any angular amount between −90° and 90°). Controller 102 receives information corresponding to a deflection of input device 101 and outputs corresponding control signals to machine tool 103. More specifically, controller 102 executes code for interpreting input signals from input device 101 and for outputting control signals for controlling a movement of machine tool 103 in an axis of movement (e.g., adjusting a tool offset in a linear axis, rotating a work tool around a rotary axis, rotating/translating a workpiece in any one of a number of linear/rotary axes, etc.). The rate of movement of machine tool 103 in the axis of movement corresponds to the amount of deflection of input device 101 from the neutral position in the axis of deflection. For example, the greater the amount of deflection of input device 101 (e.g., the further a knob is turned), the greater the rate of movement of machine tool 103 in the axis of movement.

Figure 2:
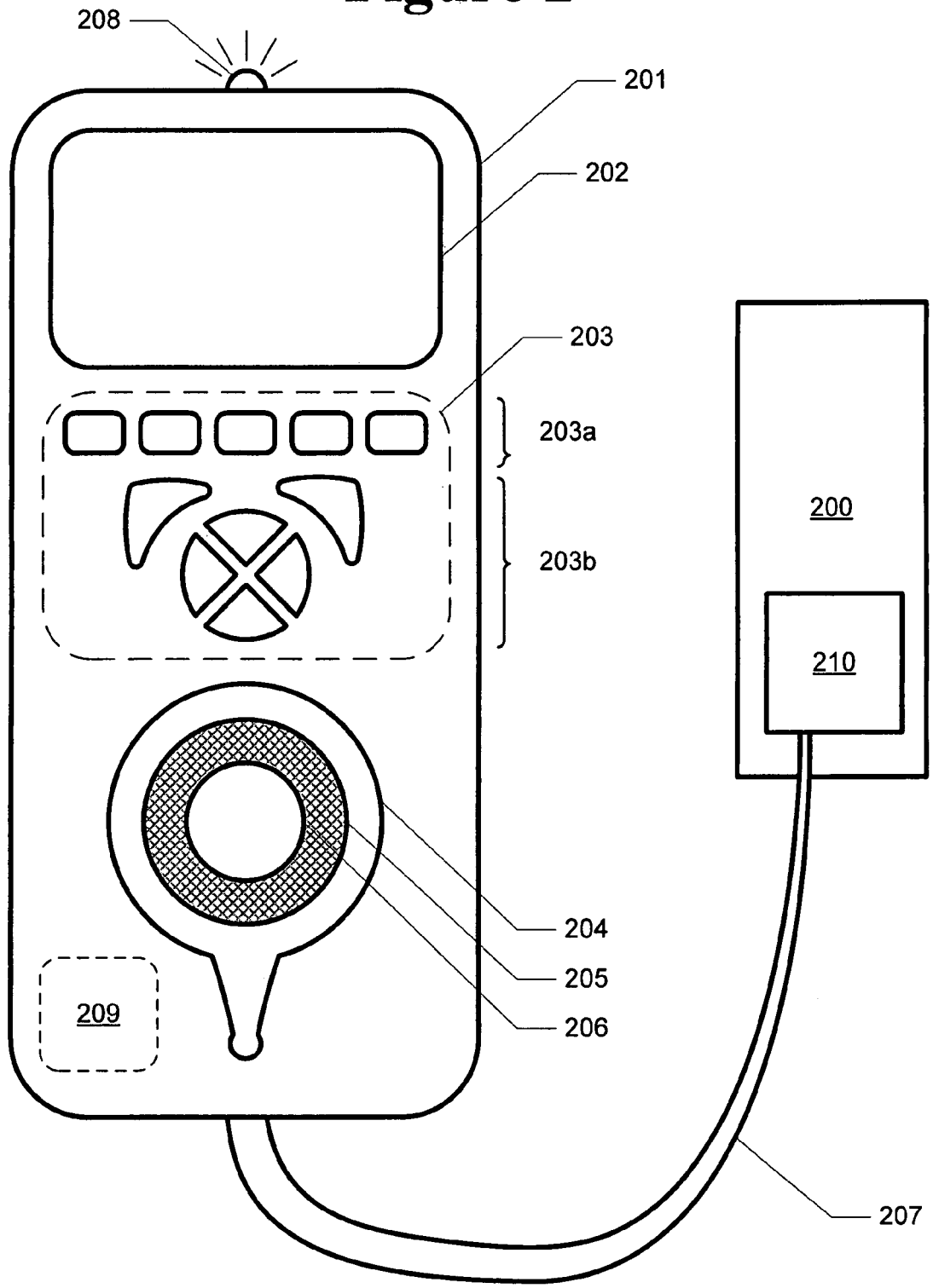
FIG. 2 illustrates a system for controlling a machine tool according to one embodiment of the present invention.

FIG. 2 illustrates a system for controlling a machine tool according to one embodiment of the present invention. The system includes a computer numerical control ("CNC") machine tool 200 (e.g., a vertical CNC machining center, a horizontal CNC machining center, a CNC lathe, various multi-axis machining centers, or the like) with both a main control 210 and a remote jog handle 201 for controlling machine tool 200. Remote jog handle 201 is connected to and communicates with machine tool 200 through a wired connection 207 to main control 210, such as an RS-232 connection. Remote jog handle 201 includes a controller 209, a light source 208, a display 202, a keypad 203, and three coaxial knobs 204, 205 and 206.

The coaxial knobs 204, 205 and 206 are stacked vertically, with the knobs higher in the stack having progressively smaller diameters, to form a "triple-stack." This triple-stack provides an operator a convenient and intuitive interface for controlling machine tool 200 that can be operated without the operator needing to divert his or her attention from the workpiece being machined. Specifically, the triple stack of knobs provides pulse jogging, smooth, variable-rate shuttle jogging and axis selection at a single interface point. The stacked knobs of differing radii provide tactile feedback that allows the operator to easily select the proper knob either for selecting the axis of motion or for jogging the machine tool.

For example, in the present exemplary embodiment, the outermost knob 204 is configured to select an axis of motion (either linear, rotary or a combination thereof) for the other knobs 205 and 206 to control. In this regard, knob 204 moves in discrete steps characterized by equally-spaced detents that provide tactile feedback to the operator and resistance to accidental motion of knob 204. Innermost knob 206 similarly moves in discrete steps characterized by detents, but knob 206 is configured to control a movement of machine tool 200 in discrete steps. For example, an operator may rotate innermost knob 206 to "pulse jog" machine tool 200 in discrete, equally-spaced steps. The size of these steps (linear or rotational units) can be configured with keypad 203 and confirmed on display 202. For example, soft menu keys 203a (whose functions correspond to functions displayed along a bottom edge of display 202, aligned with soft menu keys 203a) may be used to activate an input screen that allows hard-coded keys 203b (e.g., start and stop keys and four-way directional keys) to navigate the input screen and select the step size of the pulse jog from available menu options. Finally, the middle knob 205 is a self-centering knob used to "shuttle jog" machine tool 200 at variable speeds. More specifically, as self-centering knob 205 is rotated further away from a centered position, the speed/rate with which machine tool 200 moves in the selected axis increases.

Self-centering knob 205 can be rotated in either direction, up to a maximum deflection angle, which in the present exemplary embodiment is 45°. In other embodiments, this maximum deflection angle may be lower than 45°, higher than 45°, or even non-existent (e.g., when the shuttle jog knob is not self-centering). According to one aspect of the present invention, this maximum angle of deflection may be configured to correspond with a maximum speed of movement of machine tool 200. According to alternate aspects of the present invention, the maximum angle of deflection may be constrained to correspond with a less-than-maximum speed of movement of machine tool 200.

While in the foregoing exemplary embodiment, the movement of knobs 204 and 206 has been described as characterized by evenly-spaced detents, the scope of the present invention is not limited to such an arrangement. Rather, as will be immediately apparent to one of skill in the art, the present invention has application to machine tool control systems in which knobs with unequally-spaced detents, or even no detents at all, are used to select axes and control movements of a machine tool.

According to the present exemplary embodiment of the present invention, remote jog handle 201 includes an onboard processor 209 for generating video data for display 202 and for interpreting commands from keypad 203 and coaxial knobs 204, 205 and 206. In alternative embodiments, however, the processing for all input and output functions of remote jog handle 201 may be offloaded to a remote processor (e.g., in a main control 210), which communicates with remote jog handle 201 over wired connection 207. By offloading the processing to a remote processor, remote jog handle can be more flexible and upgradeable, such that additional functionality can be added through software upgrades of the remote processor (e.g., which may be located in main control 210 or even integrated into the machine tool itself). In yet another embodiment, processors may be provided in both remote jog handle 201 and in the main control 210, such that some processing is provided onboard remote jog handle 201 (e.g., interpreting input from keypad 203 and knobs 204, 205 and 206), while other processing is provided remotely by main control 210 (e.g., generating display information, accessing machine tool information, etc.).

In the present exemplary embodiment, processor 209 runs program code that allows an operator to execute a number of machine tool operations from remote jog handle 201. This code may be stored in a non-volatile storage device (e.g., read-only memory, flash memory, magnetic media, etc.) or in a volatile storage medium (e.g., random-access memory). The storage device may be located in the remote jog handle 201, or in a remote location (e.g., the main control 210). Processor 209 retrieves the program code from the storage device and executes the instructions stored therein to provide output to display 202 and to accept input from keypad 203 and knobs 204, 205 and 206.

For example, controller 209 may retrieve and execute code to provide four different configuration screens on display 202. In a MANUAL JOGGING screen, an operator can view a display of the current machine position. The currently selected axis of movement is highlighted and will move if the shuttle jog knob 205 or pulse jog knob 206 is moved. A different axis can be selected by using knob 204. The jog rate for the pulse jog knob 206 is displayed and can be adjusted with the left and right arrow keys 203b on keypad 203. In a TOOL OFFSETS screen, tool offsets can be checked and set. Fields can be selected with the up and down arrow keys 203b on keypad 203, and values for the tool offsets can be changed using the pulse jog knob 206. Knob 204 is still used to select axes, but on this screen, the axis line must be highlighted to jog the selected axis. Also on this screen, the cutting tool currently used by machine tool 200 can be viewed and changed. In a WORK OFFSETS screen, an operator can view and change the values for the workpiece offsets. Finally, in a PROGRAM DISPLAY (Run Mode) screen, the currently running machine tool program is displayed. Menu options displayed across the bottom edge of display 202 allow an operator to turn coolant on or off, activate single block and block delete functions, or stop the program using soft menu keys 203a. Toggled commands such as COOL will appear highlighted on display 202 when they are turned on. The foregoing description of menus and information screens provided on display 202 is merely an exemplary list of a few of the possible arrangements of information on display 202. The scope of the present invention is not limited to these particular arrangements, however, as processor 209 can be programmed to output any number of different menu screens or information on display 202.

As set forth above, keypad 203 includes soft menu buttons 203a along a bottom edge of display 202. Processor 209 may be programmed (i.e., provided with program code) to display menu options corresponding to soft menu buttons 203a (i.e., aligned on screen with soft menu buttons 203a). Alternatively, in an embodiment of the present invention in which display 202 is a touch-screen display, processor 209 may be programmed to output menu options which correspond to input regions of the touch-screen display, such that an operator can select menu options by inputting commands (e.g., tapping or dragging fingertips or styli) directly on display 202.

Moreover, processor 209 can be programmed to implement a number of safety features to mitigate the risk of unintentional commands received from remote jog handle 201 or from main panel 210, or to prevent a disturbance in communication between remote jog handle 201 and machine tool 200 from negatively affecting a workpiece in machine tool 200. For example, controller 209 can be programmed so that when an operator presses any key on keypad 203 during axis motion, the spindle and all axis motion will immediately stop, and the message "Button pressed while axis was moving— Reselect Axis" will appear on display 202. If the axis selection knob 204 is moved while the shuttle jog knob 205 is turned, the message "Axis selection changed while axis was moving-Reselect Axis" will appear on display 202, and all axis motion will stop. If the shuttle jog knob 205 is turned from its centered position when the remote jog handle 201 is removed from its cradle (i.e., before axis select knob 204 is used to select an axis), or when the control mode is changed to a mode with motion (for instance, from MDI to Handle Jog mode), the message "Shuttle off center-No Axis selected" will appear on display 202 and no axis motion will occur. If the pulse jog knob 206 is rotated while the shuttle jog knob 205 is in use, the message "Conflicting jog commands— Reselect Axis" will appear on display 202, and all axis motion will stop. If contact between remote jog handle 201 and the machine tool 200 is broken for any reason (e.g., if wired connection 207 is cut or disconnected, etc.), all axis motion can be configured to stop.

While in the foregoing exemplary embodiment, wired connection 207 has been described as an RS-232 connection, the scope of the present invention is not limited to such an arrangement. Rather, as will be readily apparent to one of skill in the art, the present invention has application to remote jog handles which communicate with machine tools using any communication format or medium. In alternative aspects, wired connection 207 may be a USB connection, an IEEE 1394 connection, an LVDS connection, a RJ-45 connection, a fiberoptic connection, a RJ-11 connection, or any other wired connection known to those of skill in the art. According to yet another embodiment of the present invention, a remote jog handle may communicate with a machine tool using a wireless connection, such as an RF connection, an infrared connection, a Bluetooth® connection, or any other wireless connection known to those of skill in the art. In an embodiment in which a remote jog handle communicates with a machine tool wirelessly, the remote jog handle may include either a battery or any other power supply (e.g., fuel cell, capacitor, etc.) for powering the wireless antenna, the display, the processor, and the light source.

An additional benefit provided by remote jog handle 201 is its ability to illuminate with light source 208, a workpiece being machined by machine tool 200. This is equally the case whether the remote jog handle is connected to the machine tool by a wire (as in the present exemplary embodiment) or by a wireless connection. Light source 208 may be any one of a number of light sources known to those of skill in the art, such as, for example, a light emitting diode ("LED"), an incandescent bulb, a fluorescent bulb, a laser etc. Light source 208 receives power from remote jog handle 201, either from an onboard power supply (e.g., a battery, a fuel cell, a capacitor, etc.), or through wired connection 207 from machine tool 200. Moreover, light source 208 is controllable using the various inputs of remote jog handle 201. For example, light source 208 may be activated using keypad 203 to navigate a series of menus displayed on display 202 and to select an operational mode of light source 208. Alternatively, a dedicated switch (not illustrated) may be provided on remote jog handle 201 to select the various operational states of light source 208. According to one aspect of the present invention, light source 208 is capable of operating in a number of operational states, including ON (steady), OFF, STROBE, various intensity settings, etc. The speed and phase with which light source strobes in the STROBE mode is configurable, as is the intensity of light source 208, using either keypad 203 or any of knobs 204, 205 or 206. According to one aspect of the present invention, any one of knobs 204, 205 or 206 may be used to select an operational mode of light source 208, or to select an intensity level of light source 208. For example, in connection with a function selected on display 202 (or in conjunction with the activation of a modifier/function key), pulse jog knob 206 may be used to variably dim or brighten light source 208, to increase or decrease the rate at which light source 208 strobes, or to increase or decrease the phase offset at which light source 208 strobes.

According to one aspect of the present invention, light source 208 may be integrated into a casing of remote jog handle 201 to seal remote jog handle 201 against environmental contaminants. For example, light source 208 may be provided with a transparent protective cover and a sealing member (e.g., a rubber gasket or silicone O-ring) for preventing environmental contaminants (e.g., water, cutting oil, coolant, etc.) from intruding into a casing of remote jog handle 201 and damaging the components therein. The protective cover may be transparent to all wavelengths of visible light (e.g., clear) or, alternatively, may preferentially allow certain wavelengths generated by light source 208 to be transmitted while absorbing other undesirable wavelengths, in order to provided a colored light.

Figure 3:
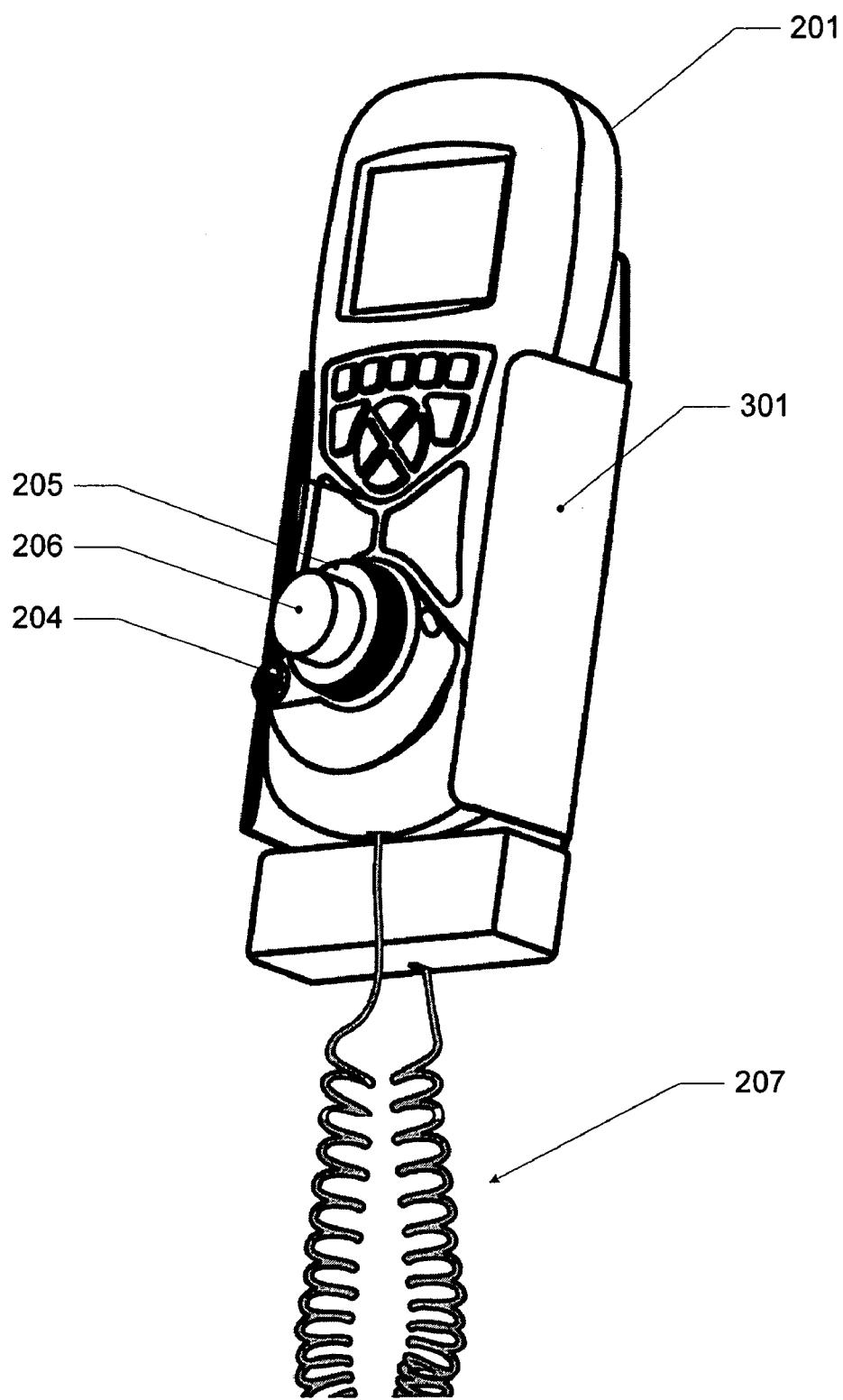
FIG. 3 illustrates a remote jog handle docked in a cradle in accordance with one embodiment of the present invention.

Turning to FIG. 3, another benefit of the machine tool control system is illustrated in accordance with another embodiment of the present invention. The system illustrated in FIG. 3 includes a cradle 301 configured to store remote jog handle 201. When remote jog handle 201 is disposed in cradle 301, remote jog handle 201 is disabled (e.g., keypad 203, display 202, knobs 204, 205 and 206, and light source 208 are disabled and/or powered off). This functionality may be provided by a mechanical switch (not illustrated) which detects the presence of remote jog handle 201, or may alternatively be provided by any other mechanical, electrical or digital means readily apparent to those of skill in the art. Furthermore, in a system in which machine tool 200 may also be controlled by main control 210, the system may be configured such that removing remote jog handle 201 from cradle 301 disables main control 210. Accordingly, an operator who wishes to control machine tool 200 using remote jog handle 201 need only remove remote jog handle 201 from cradle 301 to enable and/or power on remote jog handle 201 and disable main control 210. This prevents multiple operators from inputting contradictory commands to machine tool 200 from more than one control device. Moreover, in an embodiment of the present invention in which the remote jog handle communicates with the machine tool wirelessly, the cradle may include a power connector for charging a rechargeable battery of the remote jog handle.

Figure 4:
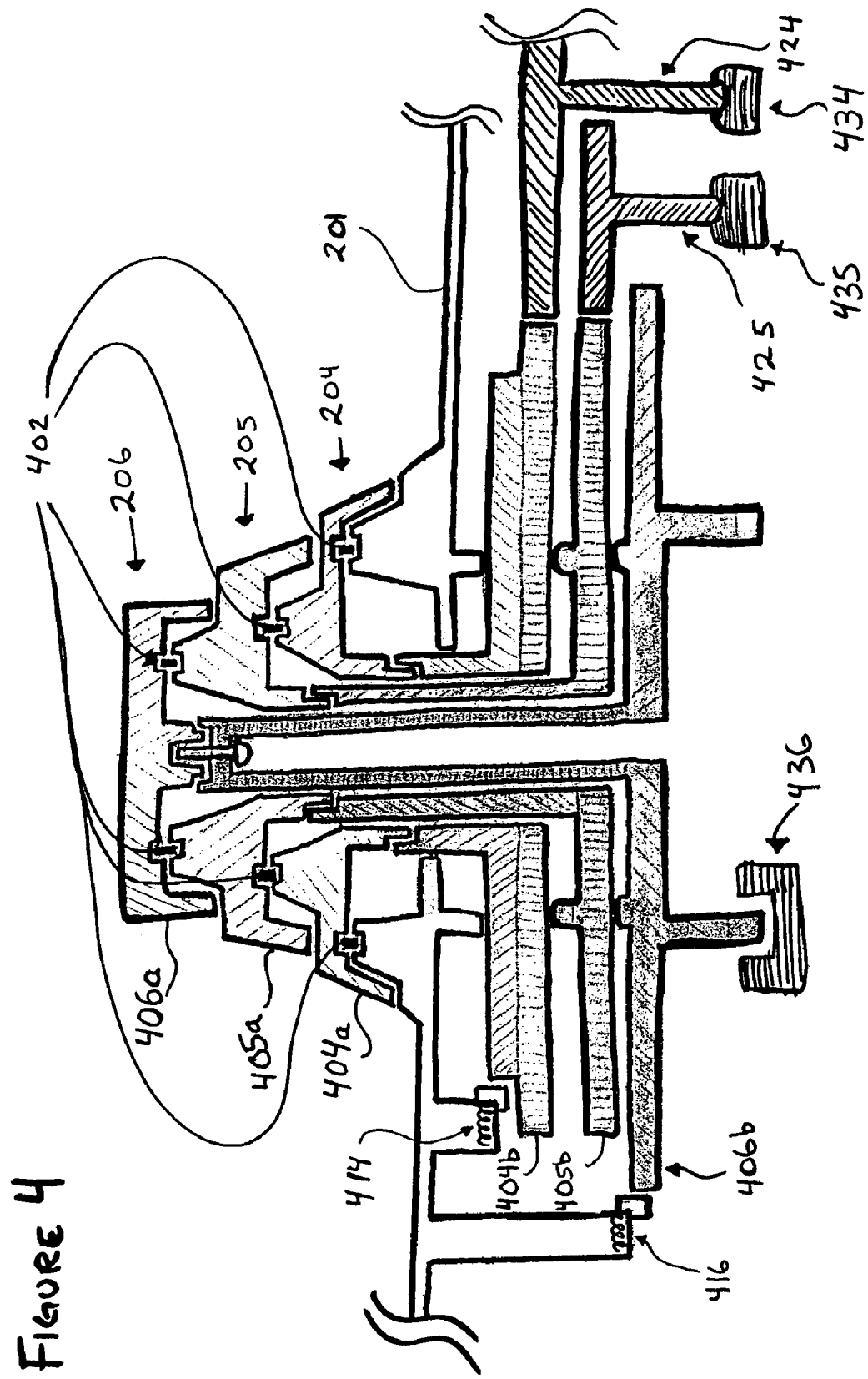
FIG. 4 illustrates an arrangement of knobs in a system for controlling a machine tool in accordance with one embodiment of the present invention.

Turning to FIG. 4, a cross-section of the configuration of the triple stack knobs of remote jog handle 201 is illustrated, in accordance with one embodiment of the present invention. Knobs 204, 205 and 206 each include upper and lower knob halves (e.g., for facilitating the construction of remote jog handle 201). More specifically, uppermost knob 206 includes upper knob half 406*a* and lower knob half 406*b*, lowermost knob 204 includes upper knob half 404*a* and lower knob half 404*b*, and self-centering knob 205 includes upper knob half 405*a* and lower knob half 405*b*. The upper knob halves 404*a*, 405*a* and 406*a* are separated by annular bearings 402 (shown here in cross section as discrete black rectangles). Each upper knob half is mated with its corresponding lower knob half in such a manner that the two are locked together and can not rotate with respect to one another. Lower knob half 404*b*, corresponding to lowermost knob 204, is constrained to move in discrete steps by detent mechanism 414—a spring loaded stopper that interfaces with (equally-spaced) notches in an outer radial surface of lower knob half 404*b*. Similarly, lower knob half 406*b*, corresponding to uppermost knob 206, is constrained to move in discrete steps by detent mechanism 416 that similarly interfaces with (equally-spaced) notches in an outer radial surface of lower knob half 406*b*. As self-centering knob 205 is configured to move smoothly (to provide variable speed control for machine tool 200), no detent mechanism is provided for lower knob half 405*b*.

The movement of knobs 204, 205 and 206 may be detected in a number of ways. For example, in the present exemplary embodiment, the rotation of uppermost knob 206 is detected by break-beam sensor 436, which interfaces with a turreted or notched annular structure of lower knob half 406*b*. Lowermost knob 204 and self-centering knob 205, however, each interface with an off axis gear (gears 424 and 425, respectively) which drives a respective potentiometer (potentiometers 434 and 435, respectively).

While FIG. 4 illustrates knobs 204, 205 and 206 in cross-section, it will be immediately apparent to one of skill in the art how to configure coaxial knobs to interface with a number of detection mechanisms such as off-axis (or even on-axis) potentiometers or break-beam sensors. For example, lower knob half 406*b* may be substantially circular in plan view, as knob 206 is configured to rotate freely through an unlimited number of revolutions, whereas lower knob halves 404*b* and 405*b* may only require a pie-wedged shape in plan view, as knobs 204 and 205 are constrained to rotate through a limited range of motion.

In the present exemplary embodiment, controller 209 is a microprocessor configured to receive input signals from knobs 204, 205 and 206 and to output corresponding control signals to machine tool 200 over wired connection 207. Controller 209 is provided with program code for interpreting the input from the various input devices of remote jog handle 201 (e.g., keypad 203 and knobs 204, 205 and 206) and communicating the appropriate control signals to machine tool 200. For example, controller 209 includes program code for converting a measured resistance of potentiometer 435 to a control signal for actuating an actuator in machine tool 200 by an amount corresponding to the measured resistance. In this manner, the greater the deflection of knob 205 from a neutral centered position, the greater (or lesser, depending upon the direction of deflection) the measured resistance of potentiometer 435 will be, and the larger the desired movement of machine tool 200 will be. Controller 209 may be programmed with an algorithm and a look-up table for comparing a measured resistance against predetermined resistance values to determine an appropriate control signal for machine tool 200, or may alternatively be programmed with code for dynamically converting resistance values to tool offsets, actuator movements, motor speeds, etc.

According to one aspect of the present invention, the upper and lower halves of knobs 204, 205 and 206 are manufactured from a plastic, such as polycarbonate. Additionally, grease may be provided between the knobs to facilitate the ease with which they can be turned. According to other aspects of the present invention, the knobs may be metal, or any other material known to those of skill in the art, and may even be made of different materials.

While the foregoing exemplary embodiment has been described and illustrated with respect to round knobs, the scope of the present invention is not limited to such an arrangement. Rather, as will be readily apparent to one of skill in the art, the present invention has application to any one of a number of controlling means that may be configured to variably select a speed of motion of a machine tool. For example, controlling means of various embodiments of the present invention include knobs, levers, switches, dials, handles, latches, triggers, cranks, wheels, joysticks, mice, track pads, trackballs, or any other such variable input device. For the purposes of the present invention, the term "knob" is explicitly intended to mean any such input device, whether rotary or linear, mechanical, electrical or computerized.

While the foregoing exemplary embodiments have been described with reference to a particular arrangement of exactly three knobs, the scope of the present invention is not limited to such an arrangement. Rather, the present invention has application to any system for controlling a machine tool in which even a single knob is configured to variably control a speed of movement of the machine tool based upon the movement of said knob from a centered or neutral position. Moreover, the scope of the present invention is not limited to the foregoing arrangement of knobs, with an outermost or lowermost knob for selecting an axis of motion, an innermost or uppermost knob for pulse jogging a machine tool and a middle knob for shuttle jogging a machine tool. Rather, the knobs may be stacked in any order, or alternatively may not even be stacked or coaxial.

Figure 5:
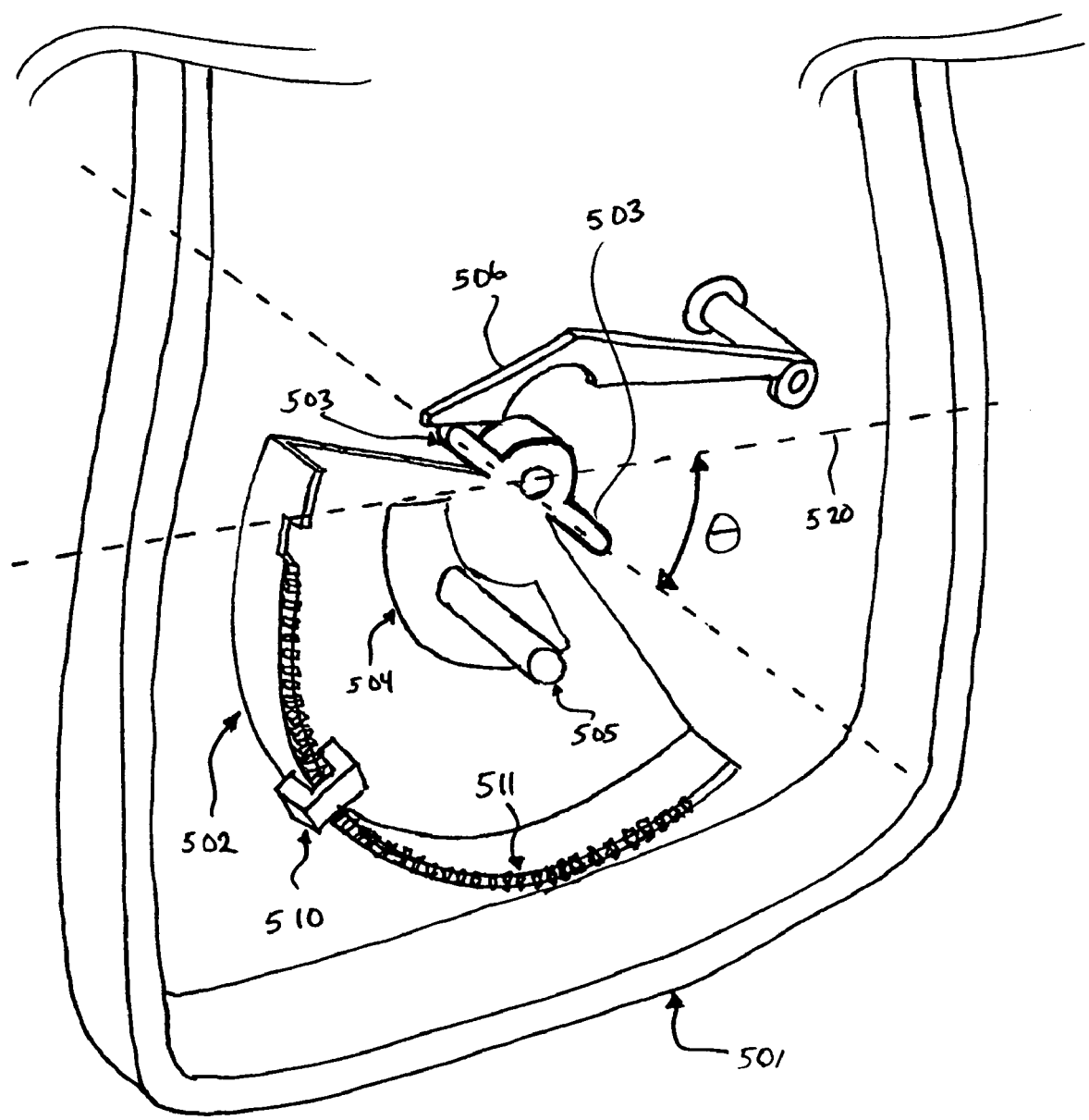
FIG. 5 illustrates a mechanism for self-centering a knob in a system for controlling a machine tool in accordance with one embodiment of the present invention.

FIG. 5 is a partial view of a remote jog handle 501 which illustrates the manner in which a knob can be configured to self-center in accordance with one aspect of the present invention. Remote jog handle 501 includes pie-wedge shaped lower knob half 502, which includes self-centering arms 503. When lower knob half 502 is rotated an angle θ away from its center position (denoted by axis 520), one of the self-centering arms 503 deflects a spring-loaded lever 506. When the operator of remote jog handle 501 releases the knob connected to lower knob half 502, the tension of the spring in spring-loaded lever 506 forces that same self-centering arm 503 back into a neutral or centered position (i.e., where θ=0). As a self-centering arm is provided on either side of lower knob half 502, the corresponding knob can be rotated either clockwise or counter-clockwise and will return to center once the operator releases the knob.

Lower knob half 502 also includes an opening 504 and a motion-limiting post 505, which together prevent lower knob half 502 from being rotated more than a maximum angle (e.g., in order to prevent over-tightening of the spring in spring-loaded lever 506). When lower knob half 502 is deflected to a sufficient angle, motion-limiting post 505 will contact an outside edge of opening 504, preventing lower knob half 502 from being further deflected in the same direction. Also illustrated in FIG. 5 is a break-beam sensor 510 which detects the rotation of lower knob half 502 by virtue of the turreted structures 511 along an outer edge of lower knob half 502.

While the present exemplary embodiment illustrated in FIG. 5 has shown a particular arrangement of levers and springs for self-centering a knob, the scope of the present invention is not limited to such an arrangement. Rather, as will be readily apparent to one of skill in the art, any number of other mechanisms may be used to make a knob, lever, dial, etc. self-centering within the scope of the present invention.

While in the foregoing exemplary embodiments, the shuttle jog knobs have been described as being disposed on a remote jog handle, the scope of the present invention is not limited to such an arrangement. Rather, the present invention has application to any machine tool control systems in which a knob is used to smoothly vary the motion of a machine tool. Accordingly, in some embodiments of the present invention, shuttle jog knobs may be disposed on the main control of a machine tool, or in any other control mechanism for operating a machine tool, or in multiple locations of a control system (e.g., both on the main control and on the remote jog handle).

While in the foregoing exemplary embodiments, the shuttle jog knobs have been described as including upper and lower halves, the scope of the present invention is not limited to such an arrangement. Rather, the present invention has application to control systems in which knobs of unitary construction, or manufactured from more than two pieces are used.

While in the foregoing exemplary embodiments, the shuttle jog input devices have been described as deflecting in a single axis of deflection, the scope of the present invention is not limited to such an arrangement. Rather, in an embodiment in which multiple axes of movement of a machine tool can be controlled simultaneously, a shuttle jog input device of the present invention could be configured to deflect in multiple axes simultaneously. For example, a four-way analog joystick could be used to provide smooth jogging in two axes of movement simultaneously, while other input devices could provide movement in even greater numbers of axes at once (e.g., a collective-style joystick with two linear axes and one rotary axis could provide smooth jogging control in three axes of movement simultaneously).

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A system for controlling a computer numerical control machine tool, the system comprising:
   a remote jog handle including a plurality of coaxial rotary knobs configured to control the machine tool, the plurality of coaxial rotary knobs including a first rotary knob deflectable from a neutral position, a second rotary knob and a third rotary knob; and
   a controller configured to:
      receive information corresponding to an actuation of the third rotary knob and to output a control signal to select an axis of movement of the machine tool from a plurality of selectable axes of movement,
      receive information corresponding to an actuation of the second rotary knob and to output a control signal to control a movement of the machine tool in the selected axis of movement in discrete steps, and
      receive information corresponding to an amount of deflection of the first rotary knob from the neutral position and to output a control signal to control a movement of the machine tool in the selected axis of movement at a rate corresponding to the amount of deflection of the first rotary knob from the neutral position.

2. The system according to claim 1, wherein the first rotary knob is self-centering to the neutral position.

3. The system according to claim 1, wherein the first rotary knob is displaceable in two directions from the neutral position.

4. The system according to claim 1, wherein the second rotary knob is configured to move in steps characterized by detents.

5. The system according to claim 1, wherein the third rotary knob is configured to move in steps characterized by detents.

6. The system according to claim 1, wherein the remote jog handle further includes a light source for illuminating the machine tool.

7. The system according to claim 1, wherein the remote jog handle is communicably coupled with the machine tool over a wired connection.

8. The system according to claim 1, wherein the remote jog handle is communicably coupled with the machine tool over a wireless connection.

9. The system according to claim 1, wherein the remote jog handle includes a display screen for displaying information about the machine tool.

10. The system according to claim 9, wherein the display screen is a touch screen configured to accept operator input to control the machine tool.

11. The system according to claim 9, wherein the remote jog handle further includes one or more input buttons along a perimeter of the display screen, wherein a function of the one or more input buttons corresponds to a displayed function on the display screen.

12. The system according to claim 1, further comprising a cradle configured to disable the remote jog handle when the remote jog handle is disposed therein.

13. The system according to claim 12, wherein the cradle is configured to charge a battery of the remote jog handle when the remote jog handle is disposed therein.

14. The system according to claim 1, wherein the controller is disposed in the remote jog handle.

15. A computer numerical control machine tool comprising:
   a work tool movable along a plurality of selectable axes of movement; and
   a control system including:
      a remote jog handle including a plurality of coaxial rotary knobs configured to control the machine tool, the plurality of coaxial rotary knobs including a first rotary knob deflectable from a neutral position, a second rotary knob and a third rotary knob; and
      a controller configured to:
         receive information corresponding to an actuation of the third rotary knob and to output a control signal to select an axis of movement of the work tool from the plurality of selectable axes of movement,
         receive information corresponding to an actuation of the second rotary knob and to output a control signal to control a movement of the work tool in the selected axis of movement in discrete steps, and receive information corresponding to an amount of deflection of the first rotary knob from the neutral position and to output a control signal to control a movement of the work tool in the selected axis of movement at a rate corresponding to the amount of deflection of the first rotary knob from the neutral position.

16. The computer numerical control machine tool of claim 15, wherein the first rotary knob is configured to automatically return to the neutral position when released by an operator.

17. The computer numerical control machine tool of claim 15, wherein the control system further includes a cradle configured to disable the remote jog handle when the remote jog handle is disposed therein.

18. A remote jog handle for controlling a computer numerical control machine tool, the remote jog handle comprising:

a plurality of coaxial rotary knobs configured to control the machine tool, the plurality of coaxial rotary knobs including a first rotary knob deflectable from a neutral position, a second rotary knob and a third rotary knob;

a controller configured to:

receive information corresponding to an actuation of the third rotary knob and to output a control signal to select an axis of movement of the machine tool from a plurality of selectable axes of movement, receive information corresponding to an actuation of the second rotary knob and to output a control signal to control a movement of the machine tool in the selected axis of movement in discrete steps, and receive information corresponding to an amount of deflection of the first rotary knob from the neutral position and to output a control signal to control a movement of the machine tool in the selected axis of movement at a rate corresponding to the amount of deflection of the first rotary knob from the neutral position; and a controllable light source for illuminating the machine tool.

19. The remote jog handle of claim 18, wherein the controllable light source is configurable to operate in a constant mode, a strobe mode, or in a dimmed mode.

20. The remote jog handle of claim 18, further including an internal power supply, wherein the remote jog handle is communicably coupled with the machine tool over a wireless connection.

* * * * *